United States Patent
Gao et al.

(10) Patent No.: US 11,270,159 B1
(45) Date of Patent: Mar. 8, 2022

(54) TRAINING CONTENT SELECTION MODELS WITH REDUCED BIAS

(71) Applicant: Meta Platforms, Inc., Menlo Park, CA (US)

(72) Inventors: Tianshi Gao, Fremont, CA (US); Wenlin Chen, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 984 days.

(21) Appl. No.: 15/925,526

(22) Filed: Mar. 19, 2018

(51) Int. Cl.
*G06K 9/62* (2022.01)
*G06Q 30/02* (2012.01)
*H04N 21/25* (2011.01)
*G06Q 30/00* (2012.01)

(52) U.S. Cl.
CPC ....... *G06K 9/6256* (2013.01); *G06Q 30/0269* (2013.01); *H04N 21/251* (2013.01); *G06Q 30/01* (2013.01)

(58) Field of Classification Search
CPC .. G06K 9/6256; G06Q 30/0269; G06Q 30/01; H04N 21/251
See application file for complete search history.

(56) References Cited

U.S. PATENT DOCUMENTS

| | | | |
|---|---|---|---|
| 2012/0158518 A1* | 6/2012 | Benyamin | G06Q 50/01 705/14.66 |
| 2015/0019460 A1* | 1/2015 | Simard | H04L 1/0079 706/11 |
| 2017/0323326 A1* | 11/2017 | Kim | G06Q 30/0243 |

OTHER PUBLICATIONS

Machine Learning to Predict Advertisement Targeting Solutions (English (United States)) IP.com Prior Art Database Disclosure Published in: The IP.com Prior Art Database Publication Date: Dec. 15, 2017 (Year: 2017).*

* cited by examiner

*Primary Examiner* — Alexandru Cirnu
(74) *Attorney, Agent, or Firm* — Fenwick & West LLP

(57) ABSTRACT

An online system trains a content selection model based on a selected subset of presented content items as well as a sampled set of content items. The content selection model is configured to receive a set of features characterizing a user-content item pair and output a likelihood that the user will interact with the content item. The sampled set of content items may include content items that were not selected for display based on their likelihoods in addition to those that were selected, and may represent a wider distribution of user-content item pairs than the selected subset. By incorporating the sampled set of content items as well as the selected subset of content items in the training process, the online system can reduce bias in the content selection process such that content items similar to the unselected subset can also be adequately represented.

20 Claims, 7 Drawing Sheets

TRAINING CONTENT SELECTION MODELS WITH REDUCED BIAS

BACKGROUND

This invention generally relates to content selection models, and more specifically to training content selection models with reduced bias.

Online systems, such as recommendation systems and social networking systems, provide content items associated with a set of content providers to users of the online system. For example, the online system may be a social networking system that provides users with advertisements associated with a set of advertisers. Typically, it is favorable for the online system and the content providers for users of the online system to engage or interact with the content items. Thus, the online system may provide content items to users based on evaluations that the users will interact with the content items. Specifically, the online system may evaluate content items by applying a content selection model to a set of characteristics for a particular user and content item pair to predict likelihoods of user interaction. The online system may present a selected subset of content items with high prediction likelihoods to users.

The content selection model is often trained using training data including previously presented content items, for which interactions between the content items and users presented with the content items are already known. The online system may continually update the content selection model as more content items are presented to users and interaction information for these content items are obtained by the online system. For example, the training data may be updated to include interaction information from the selected subset of content items that were presented to users due to their high prediction likelihoods.

Often times, various types of bias are introduced into the training data and the content selection model due to the way in which the data is obtained. In particular, since the labels for the training data indicate whether a user interacted with a content item that was presented to the user, the examples in the training data typically include only content items that were actually selected for the user. Since they were actually selected for presentation to the user, these content items tend to be associated with higher prediction likelihoods from the existing model and are therefore biased towards what the existing model predicts to be "good" content. Due to this bias in the training data, content items similar to the selected subset may have a significantly higher chance of being presented to users than those similar to unselected content items with, for example, low predicted likelihoods. Accordingly, certain types of content items may be underrepresented with respect to the proportion of times they are presented to users of the online system, even though they may potentially have high likelihoods of interaction.

SUMMARY

An online system trains a content selection model based on a selected subset of presented content items as well as a sampled set of content items. The content selection model is configured to receive a set of features characterizing a user-content item pair and output a prediction likelihood that the user will interact with the content item. The sampled set of content items may include content items that were not selected for display based on their prediction likelihoods in addition to those that were selected, and may represent a wider distribution of user-content item pairs than the selected subset. By incorporating the sampled set of content items as well as the selected subset of content items in the training process, the online system can reduce bias in the content selection process such that content items similar to the unselected subset can be adequately represented in addition to content items similar to the selected subset.

In one embodiment, a set of parameters for the content selection model are trained based on a multi-branched model including a prediction portion and an autoencoder portion that share one or more common parameters with each other. Specifically, the prediction portion is configured to receive the set of features for a user-content item pair and output the prediction likelihood for the pair. The autoencoder portion is configured to receive the set of features for the user-content item pair and output a reconstructed set of features that mimic the original set of features for the pair. In one instance, the multi-branched model is a neural network including a plurality of layers of nodes, in which parameters associated with each layer of the neural network model represent relationships in the input data at different levels of abstraction. In such an instance, the prediction portion and the autoencoder portion may each include a shared portion having one or more common layers with each other.

During the training process, the online system repeatedly alternates between training the prediction portion and the autoencoder portion. The prediction portion is trained using training data for a subset of user-content item pairs that were previously evaluated and selected for display to users of the online system. The online system obtains the training data for the prediction portion by identifying a set of features characterizing the selected users and content items, and identifying corresponding labels indicating whether the users interacted with the content items. The autoencoder portion is trained using training data for a sampled set of user-content item pairs that may include content items that were previously evaluated but were not selected for display to users of the online system. The online system obtains the training data for the autoencoder portion by sampling a subset of evaluated user-content items, and identifying the set of features for the sampled users and content items.

At each iteration of the training process, the online system selects the prediction portion or the autoencoder portion for training. Responsive to selecting the prediction portion, the online system updates the parameters of the prediction portion to reduce a prediction loss. Responsive to selecting the autoencoder portion, the online system updates the parameters of the autoencoder portion to reduce an autoencoder loss. The prediction loss represents a difference between the labels of the training data for the selected subset and estimated labels generated by applying the prediction portion to the set of features for the selected subset. The autoencoder loss represents a difference between the set of features of the training data for the sampled subset and the set of reconstructed features generated by applying the autoencoder portion to the set of features for the sampled subset.

Through the training process, the set of shared parameters between the prediction portion and the autoencoder portion learn relationships between the set of features that contribute to both the prediction of user interaction likelihoods and the reconstruction of the set of features based the training data obtained from the selected subset and the sampled subset.

In one embodiment, set of parameters for the prediction portion are selected as the set of parameters for the content selection model. During the inference process, the prediction likelihood for a new user-content item pair is generated by applying the content selection model to the set of features for the pair. By selecting the set of parameters of the prediction portion as the set of parameters of the content selection model, the online system can reduce bias in the content selection process, such that user-content item pairs similar to those of the selected subset and the sampled subset can be adequately represented during the content selection process.

In another embodiment, the set of parameters for the content selection model are trained based on a multi-branched model including a first prediction portion and a second prediction portion that share one or more common parameters with each other. Different from the previous embodiment, both portions of the multi-branched model are configured to receive the set of features and output a prediction likelihood for a user-content item pair. When the training process is completed, the set of parameters for either the first prediction portion or the second prediction portion may be selected as the set of parameters for the content selection model. The first prediction portion and the second prediction portion may also each include a shared portion having one or more common layers with each other.

During the training process, the first prediction portion is trained using the training data for the selected subset of user-content item pairs. The second prediction portion is trained using training data for the sampled set of user-content item pairs that may include content items that were not selected for display due to being ranked higher than other content items, but were presented to users of the online system anyway to obtain unbiased training data. Specifically, the online system obtains the training data for the second prediction portion by sampling the subset of evaluated user-content items, and presenting the sampled subset to users of the online system even though some may be associated with low likelihoods of user interaction. The online system identifies the set of features and corresponding labels for the sampled subset of user-content item pairs.

At each iteration, the online system repeatedly selects the first prediction portion or the second prediction portion for training. Responsive to selecting the first prediction portion, the online system updates the parameters of the first prediction portion to reduce a first prediction loss. Responsive to selecting the second prediction portion, the online system updates the parameters of the second prediction portion to reduce a second prediction loss.

In one embodiment, the set of parameters of the second prediction portion are selected as the set of parameters of the content selection model. In another embodiment, the set of parameters of the second prediction portion and the first prediction portion are selected as the set of parameters of the content selection model. During the inference process, the prediction likelihood for a new user-content item pair may be generated by applying the content selection model to the set of features for the pair to generate a first likelihood from the first prediction portion and a second likelihood from the second prediction portion. The prediction likelihood may be determined as a combination of the two likelihoods.

The multi-branched architecture including the first prediction portion and the second prediction portion is further advantageous when a disproportionate amount of training data is obtained for the selected subset and sampled subset. For example, the online system may present a significantly smaller number of content items in the sampled subset compared to those in the selected subset if content items in the sampled subset are evaluated to have low prediction likelihoods. By alternating between a training process for the first prediction portion and the second prediction portion in a multi-branched architecture, the shared layers may take advantage of the large amount of training data from the selected subset, while the remaining portions of the second prediction portion are dedicated to learning relationships specific to the training data of the sampled subset.

Figure 1:
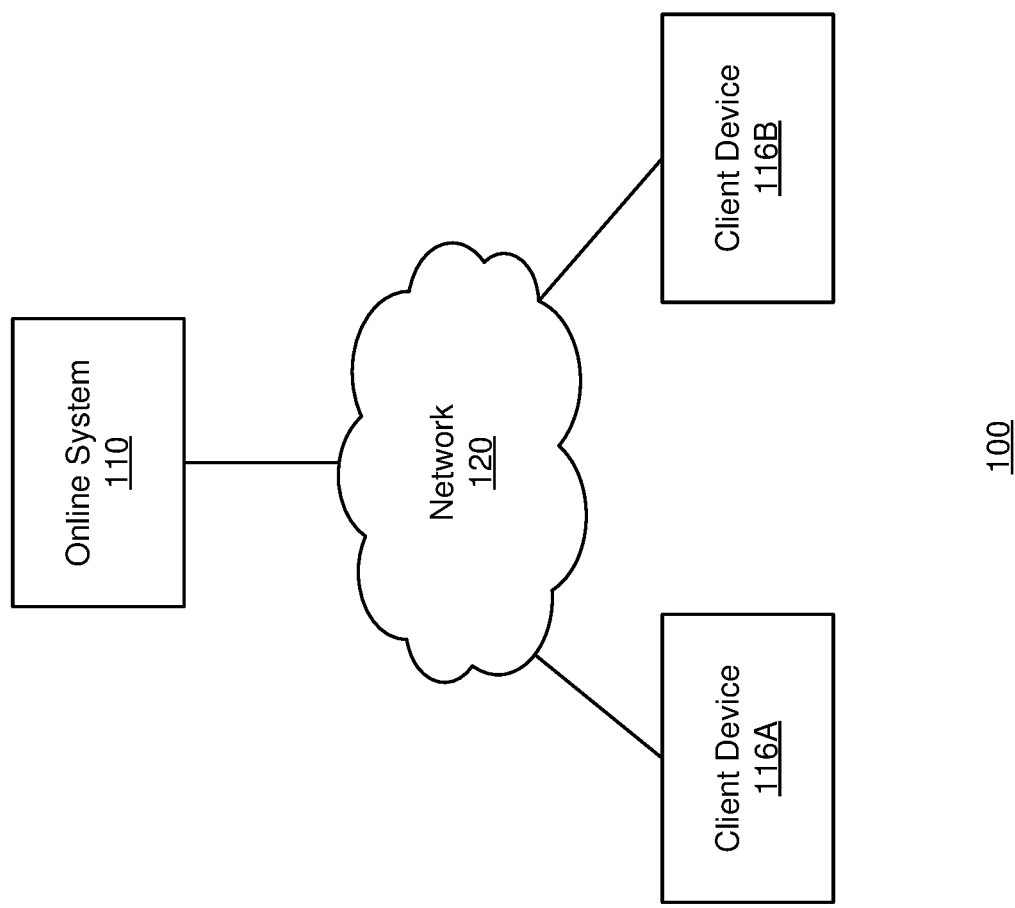
FIG. 1 is a block diagram of a system environment including an online system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1 is a block diagram of a system environment 100 including an online system 110, in accordance with an embodiment. The system environment 100 shown in FIG. 1 comprises an online system, one or more client devices 116A, 116B, and a network 120. In alternative configurations, different and/or additional components may be included in the system environment 100.

The online system 110 provides content items associated with a set of content providers to users of the online system 110. The content items may be, for example, videos, images, or advertisements. For example, the online system 110 may be a social networking system that provides users with advertisements associated with a set of advertisers. Typically, it is favorable for the online system 110 and the content providers for users of the online system 110 to engage or interact with the content items. Thus, for a given user, the online system 110 may evaluate a plurality of candidate content items with respect to their predicted likelihoods of user interaction, and select a subset of content items with high interaction likelihoods for presentation to the user.

In one embodiment, the online system 110 evaluates the plurality of content items by applying a content selection model to a set of features characterizing a particular user and content item to predict the likelihood of interaction. The content selection model is trained using training data including previously content items, for which the interactions between the content items and the users presented with the content items are already recorded. The set of features may include, for example, user profile information such as age, gender, residence location, and content item information such as related industry and type of content. Interactions of interest may include, for example, the user clicking the content item, viewing the content item, and purchasing a product after viewing the content item.

After an initial training process, the online system 110 may continuously update the content selection model as more content items are presented to users and interaction information for these content items are obtained by the online system 110. For example, the online system 110 may monitor and record user interactions for selected content items with high prediction likelihoods that were presented to users of the online system 110. The training data for the content selection model may be updated to include interaction information from the selected subset of content items.

Often times, various types of bias are introduced into the training data and the content selection model due to the way in which the data is obtained. In particular, the training data may include a significant number of the selected subset of content items that are associated with high prediction likelihoods because the online system 110 expects these types of content items to have more favorable outcomes than others, and thus, selects these content items for presentation more than others. Due to the bias in the training data, content items similar to the selected subset may have a significantly higher chance of being presented to users than those similar to unselected content items with, for example, low predicted likelihoods.

Such effects may become more pronounced as the feedback loop of updating the training data with the selected content items and re-training the content selection model with the updated training data are repeatedly iterated. Thus, certain types of content items may be underrepresented with respect to the proportion of times they are presented to users of the online system 110, even though they may be a good match for a corresponding user, and thus, may potentially have high likelihoods of interaction.

Thus, in one embodiment, the online system 110 continuously re-trains the content selection model based on a selected subset of presented content items as well as a sampled set of content items in the training data. The sampled set of content items may include content items that were not selected for display based on their predicted likelihoods, optionally in addition to those that were selected. Thus, the sampled set of content items represent a wider distribution of user-content item pairs than the selected subset. By incorporating the sampled set of content items as well as the selected subset of content items in the training process, the online system 110 can reduce bias in the content selection process such that content items similar to the unselected subset can also be adequately represented.

In one embodiment, a set of parameters of the content selection model are trained based on a multi-branched model including a prediction portion and an autoencoder portion. Specifically, the prediction portion is configured to receive the set of features $x_{(i,j)}$ for a user-content item pair $(u_i, c^i_j)$ and output the prediction likelihood $y'_{(i,j)}$ for the pair. The autoencoder portion is configured to receive the set of features $x_{(i,j)}$ for a user-content item pair and output a reconstructed set of features $x'_{(i,j)}$ that mimic the original features of the pair. In one particular embodiment, the multi-branched model is a neural network model, in which the set of parameters for the prediction portion and the autoencoder portion share one or more common parameters with each other. When the training process is completed, the set of parameters of the prediction portion are selected as the set of parameters for the content selection model.

During the training process, the online system 110 repeatedly alternates between training the prediction portion and the autoencoder portion. The prediction portion is trained using training data T obtained from the selected subset of user-content item pairs that were selected for display to users of the online system 110. The online system 110 obtains the training data T for the prediction portion by identifying a set of features $x_{(i,j)\in T}$ for the selected users and content items, and identifying corresponding labels $y_{(i,j)\in T}$ indicating whether the users interacted with the content items. The autoencoder portion is trained using training data S for a sampled set of user-content item pairs that may include content items that were not selected for display to users of the online system 110, optionally in addition to those that were. The online system 110 obtains the training data for the autoencoder portion by sampling a subset of evaluated user-content items, and identifying the set of features $x_{(i,j)\in S}$ for the sampled pairs.

Figure 2:
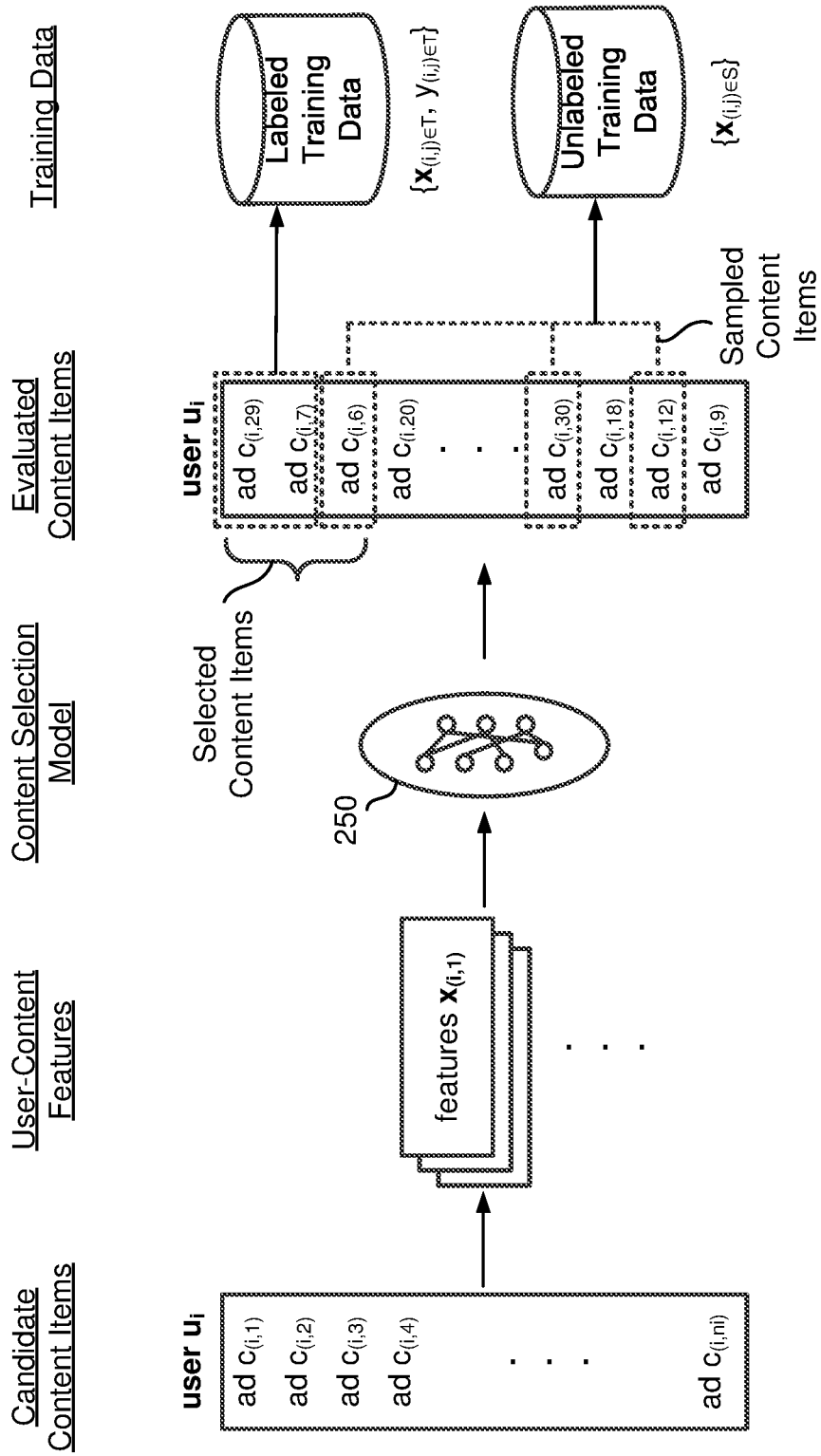
FIG. 2 illustrates an example process for obtaining training data for training a content selection model, in accordance with an embodiment.

FIG. 2 illustrates an example process for obtaining training data for training a content selection model, in accordance with an embodiment. In the example shown in FIG. 2, the online system 110 provides users with a plurality of advertisement content items. Specifically, the online system 110 identifies a plurality of $n_i$ candidate advertisements $c_{(i,1)}$, $c_{(i,2)}$, ..., $c_{(i,ni)}$ for a given user $u_i$. The online system 110 identifies a set of features $x_{(i,1)}, x_{(i,2)}, \ldots, x_{(i,ni)}$ for each pair of user-candidate advertisements. The online system 110 generates evaluations for the plurality of candidate advertisements by applying a content selection model 250 to the set of features of the candidate advertisements. As shown in FIG. 2, the evaluated advertisements may be ranked according to their likelihoods of user interaction with user $u_i$, with advertisement $c_{(i,29)}$ having the highest prediction likelihood, and $c_{(i,9)}$ having the lowest prediction likelihood. The online system 110 may select a subset of advertisements $c_{(i,29)}, c_{(i,7)},$ and $c_{(i,6)}$ for presentation to user $u_i$.

The online system 110 obtains training data T from user-advertisements $(u_i, c^i_{29})$ and $(u_i, c^i_7)$ from the selected subset. Specifically, the training data T includes labeled data with a set of features $x_{(i,j)\in T}$ and labels $y_{(i,j)\in T}$ for the user-content item pairs. The online system 110 also samples a set of evaluated content items that include advertisements $c_{(i,30)}, c_{(i,12)}$ not included in the selected subset, and also advertisement $c_{(i,6)}$ included in the selected subset. The online system 110 obtains training data S from user-advertisements $(u_i, c^i_{30})$, $(u_i, c^i_{12})$, $(u_i, c^i_6)$ from the sampled subset. Specifically, the training data S includes unlabeled data with a set of features $x_{(i,j)\in S}$ for the user-content item pairs.

The client device 116 is a computing device capable of receiving user input as well as communicating via the network 120. While two client devices 116A, 116B are illustrated in FIG. 1, in practice many client devices 116 may communicate with the systems in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone, or another suitable device. A client device 116 is configured to communicate via the network 120.

Users of the online system 110 can interact with the online system 110 through client devices 116. Specifically, a user of a client device 116 may view or interact with content items through the online system 110. For example, a user of a client device 116 may view videos on a video hosting system, or click on an advertisement provided by a social networking system. In one embodiment, a client device 116 executes an application allowing the user to interact with the online system 110. For example, a client device 116 executes a browser application to enable interaction between the client device 116 and the online system 110. In another embodiment, a client device 116 interacts with the online system 110 through an application programming interface (API) running on a native operating system of the client device 110, such as IOS® or ANDROID™.

In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Training and Deployment Process of Content Selection Model

Figure 3:
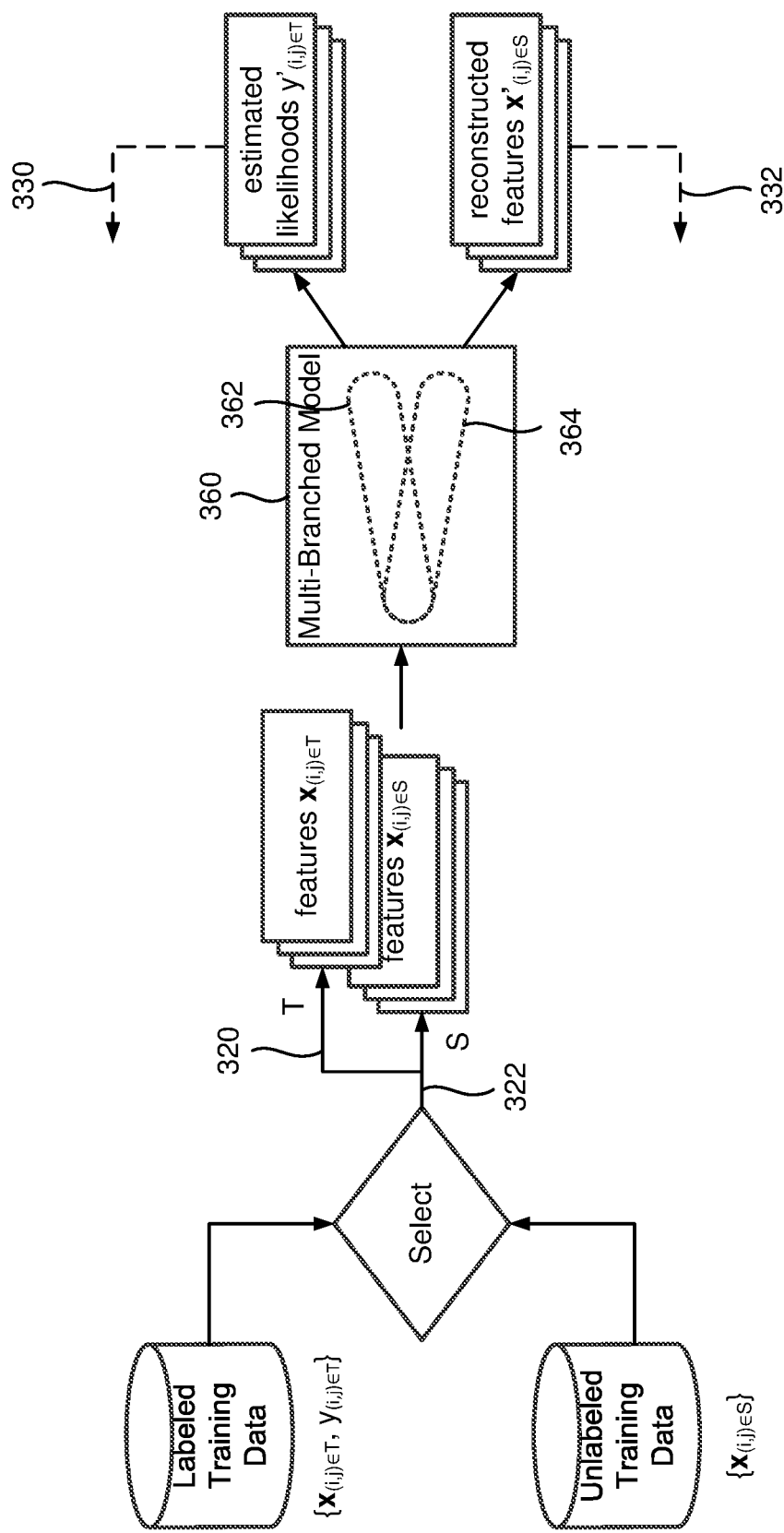
FIG. 3 illustrates a process of training a multi-branched model, in accordance with an embodiment.

FIG. 3 illustrates a process of training a multi-branched model 360, in accordance with an embodiment. As shown in FIG. 3, the multi-branched model 360 includes a prediction portion 362 and an autoencoder portion 364 that share one or more common parameters with each other. During the training process of the multi-branched model, the online system 110 selects either the prediction portion 362 or the autoencoder portion 364 for training. Responsive to selecting the prediction portion 362, the online system 110 updates the parameters of the prediction portion 362 to reduce a prediction loss. Responsive to selecting the autoencoder portion 364, the online system 110 updates the parameters of the autoencoder portion 364 to reduce an autoencoder loss. The prediction portion 362 and the autoencoder portion 364 of the multi-branched model 360 are each trained by repeatedly iterating through a forward pass step and a backpropagation step to update the parameters of the model.

The prediction loss represents a difference between the labels $y_{(i,j) \in T}$ of the training data T for the selected subset and estimated labels $y'_{(i,j) \in T}$ generated by applying the prediction portion 362 to the set of features $x_{(i,j) \in T}$ for the selected subset. In one embodiment, the prediction loss is given by:

$$L_p(y'_{(i,j) \in T}, y_{(i,j) \in T}; \theta_p) = \sum_{(i,j) \in T} \|y'_{(i,j) \in T} - y_{(i,j) \in T}\|_2^2$$

where $\theta_p$ is the set of parameters for the prediction portion 362. The autoencoder loss represents a difference between the set of features $x_{(i,j) \in S}$ of the training data for the sampled subset and the set of reconstructed features $x'_{(i,j) \in S}$ generated by applying the autoencoder portion 364 to the set of features $x_{(i,j) \in S}$ for the sampled subset. In one embodiment, the autoencoder loss is given by:

$$L_a(x'_{(i,j) \in S}, x_{(i,j) \in S}; \theta_a) = \sum_{(i,j) \in S} \|x'_{(i,j) \in S} - x_{(i,j) \in S}\|_2^2$$

where $\theta_a$ is the set of parameters for the autoencoder portion.

Responsive to selecting the prediction portion 362 for training, the online system 110 performs one or more iterations of the forward pass step and the backpropagation step to train the set of parameters of the prediction portion 362. The selection of the prediction portion 362 is shown as branch 320 in FIG. 3. Specifically, during the forward pass step, the online system 110 generates estimated likelihoods $y'_{(i,j) \in T}$ by applying the prediction portion 362 of the multi-branched model 360 with a set of estimated parameters $\theta_p$ to the set of features $x_{(i,j) \in T}$ in the labeled training data T. The online system 110 determines the prediction loss 330 based on the differences between the labels and estimated labels. The set of parameters $\theta_p$ of the prediction portion 362 are updated by backpropagating one or more error terms obtained from the prediction loss 330.

Responsive to selecting the autoencoder portion 364 for training, the online system 110 performs one or more iterations of the forward pass step and the backpropagation step to train the set of parameters of the autoencoder portion 364. The selection of the autoencoder portion 364 is shown as branch 322 in FIG. 3. Specifically, during the forward pass step, the online system 110 generates a reconstructed set of features $x'_{(i,j) \in S}$ by applying the autoencoder portion 364 of the multi-branched model 360 with a set of estimated parameters $\theta_a$ to the set of features $x'_{(i,j) \in S}$ in the unlabeled training data S. The online system 110 determines the autoencoder loss 332 based on the differences between the set of features and the reconstructed set of features. The set of parameters $\theta_a$ of the autoencoder portion 364 are updated by backpropagating one or more error terms obtained from the autoencoder loss 332.

In one embodiment, the online system 110 alternates between training the prediction portion 362 and the autoencoder portion 364. In another embodiment, the online system 110 randomly selects the prediction portion 362 and the autoencoder portion 364 for training. Specifically, the prediction portion 362 may be selected with probability p, while the autoencoder portion 364 may be selected with probability 1-p. In one instance, the selection probability is adjusted according to the relative amount of training data T obtained from the selected subset, and the training data S obtained from the sampled subset. For example, when the relative proportion of training data T for the selected subset is 70%, and the relative proportion of training data S for the sampled subset is 30%, the online system 110 may select the prediction portion 362 approximately 70% of the time and the autoencoder portion 364 approximately 30% of the time.

The prediction portion and the autoencoder portion of the multi-branched model share one or more common layers with each other. In one embodiment, the prediction portion includes a shared portion and a prediction branch that includes one or more layers specific to the prediction portion. The shared portion is configured to receive the set of features $x_{(i,j)}$ for a user-content item pair and output an intermediate representation $z_{(i,j)}$. The prediction branch is coupled to the shared portion and is configured to receive the intermediate representation $z_{(i,j)}$ and output the prediction likelihood $y'_{(i,j)}$ for the pair. The autoencoder portion includes the shared portion and an autoencoder branch that includes one or more layers specific to the autoencoder portion. The autoencoder branch is coupled to the shared portion and is configured to receive the intermediate representation $z_{(i,j)}$ and output the reconstructed set of features $x'_{(i,j)}$ for the pair.

Figure 4A:
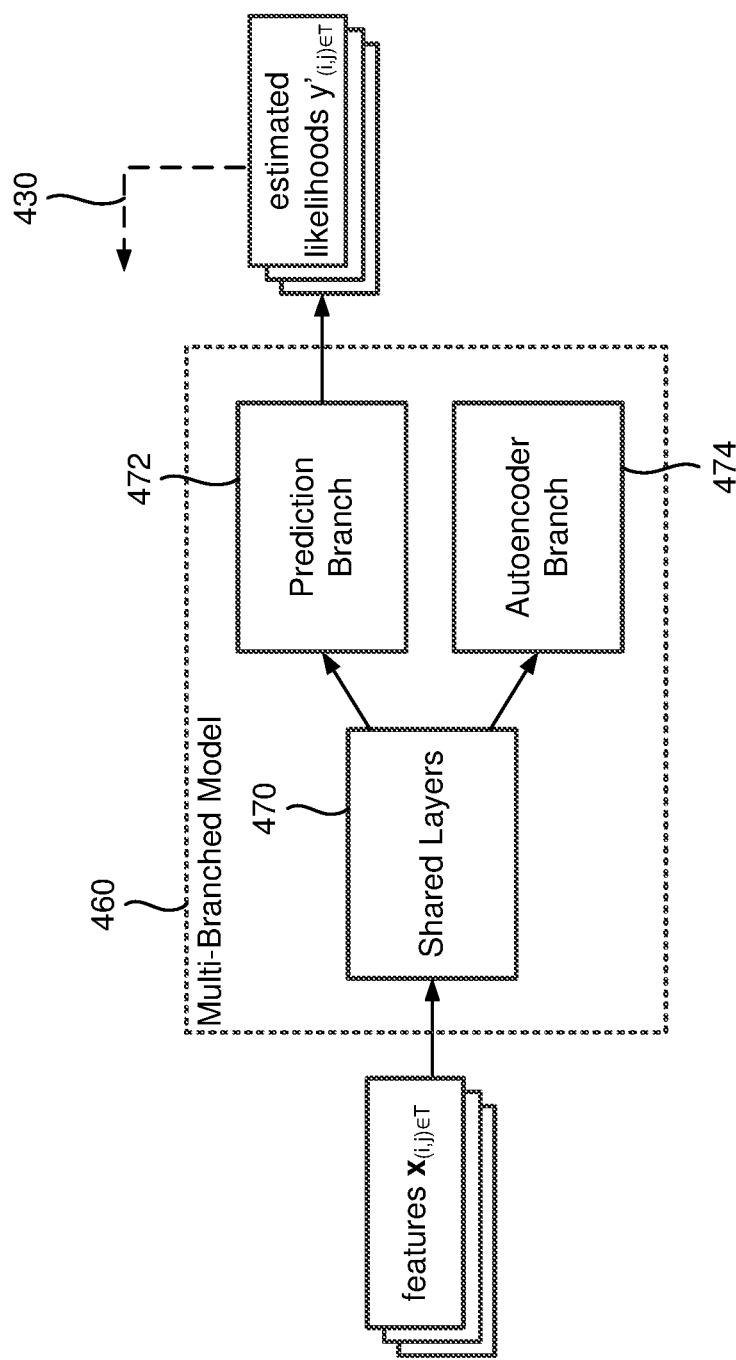
FIG. 4A illustrates a process of training a prediction portion of the multi-branched model, in accordance with an embodiment.
Figure 4B:
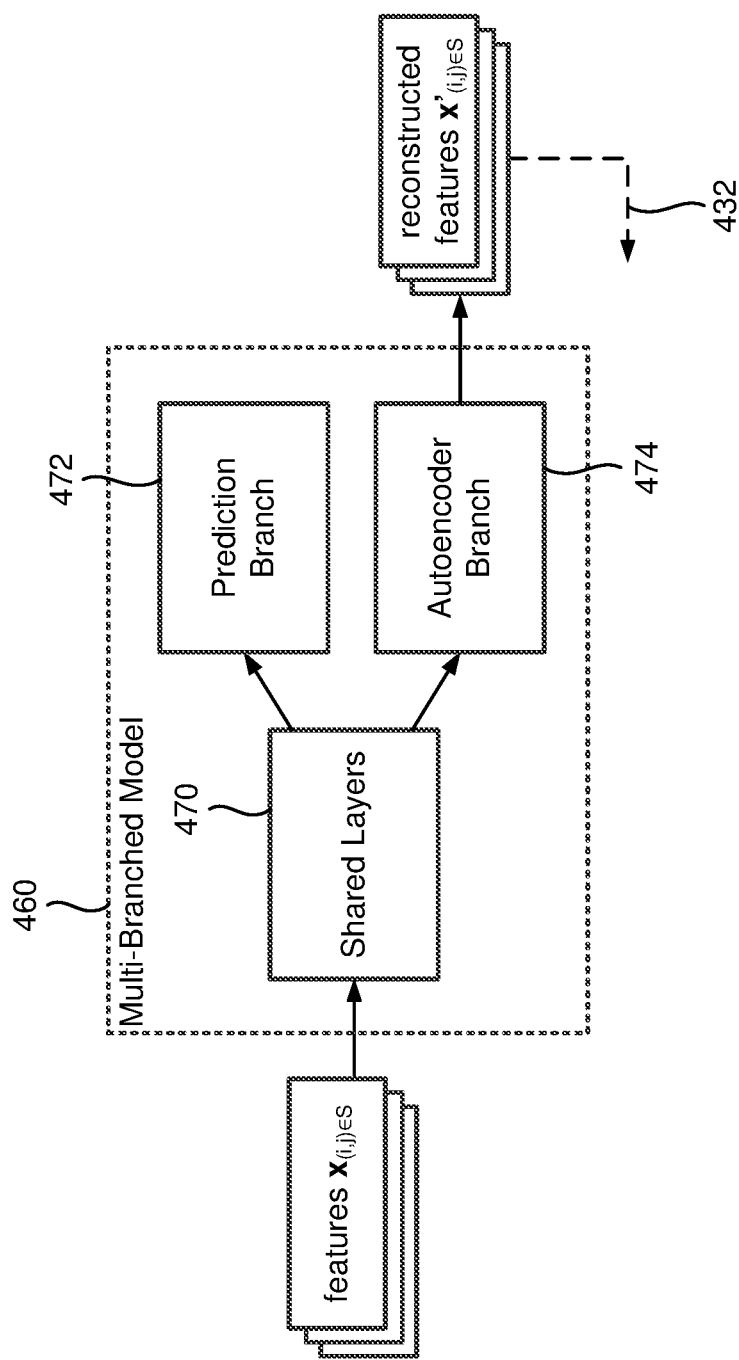
FIG. 4B illustrates a process of training an autoencoder portion of the multi-branched model, in accordance with an embodiment.

FIG. 4A illustrates a process of training a prediction portion of the multi-branched model, in accordance with an embodiment. FIG. 4B illustrates a process of training an autoencoder portion of the multi-branched model, in accordance with an embodiment. As shown in FIGS. 4A and 4B, the multi-branched model 460 includes one or more shared layers 470, a prediction branch 472, and an autoencoder branch 474. The prediction portion includes the shared layers 470 and the prediction branch 472. The autoencoder portion includes the shared layers 470 and the autoencoder branch 474.

As shown in FIG. 4A, during the forward pass step of the training process for the prediction portion, the online system 110 generates the estimated likelihoods $y'_{(i,j) \in T}$ by propagating the set of features $x_{(i,j) \in T}$ through the shared layers 470 and the prediction branch 472. During the backpropagation step, the online system 110 determines the prediction loss 430 and updates the parameters $\theta_s$ for the shared layers 470 and the parameters $\theta'_p$ for the prediction branch 472 to reduce the prediction loss 430. As shown in FIG. 4B, during the forward step of the training process for the prediction portion, the online system 110 generates the reconstructed set of features $x'_{(i,j) \in S}$ by propagating the set of features $x_{(i,j) \in S}$ through the shared layers 470 and the autoencoder branch 474. During the backpropagation step, the online system 110 determines the autoencoder loss 432 and updates the parameters $\theta_s$ for the shared layers 470 and the parameters $\theta'_a$ for the autoencoder branch 474 to reduce the autoencoder loss 432.

By repeatedly iterating between training the prediction portion and the autoencoder portion, the set of shared parameters $\theta_s$ common to the prediction portion and the autoencoder portion can learn relationships between the set of features that contribute to both the prediction of user interaction likelihoods and the reconstruction of the set of features using training data obtained from the selected subset and the sampled subset. The set of parameters $\theta'_p$ for the prediction branch 472 can learn relationships specific to the prediction of user interaction likelihoods based on parameters trained using labels $y_{(i,j) \in T}$ in the selected subset. The set of parameters $\theta'_a$ of the autoencoder branch 474 can learn relationships specific to reconstructing the original set of features $x_{(i,j) \in S}$ in the sampled subset.

In one embodiment, the autoencoder portion of the multi-branched model includes one or more bottleneck layers that includes fewer nodes than the previous layers. Specifically, the dimension of the bottleneck layers may be smaller than the dimension of the input layer of the multi-branched model. The bottleneck layers allow the set of parameters $\theta_a$ of the autoencoder portion to capture relationships in the set of features that are more critical than others for reconstructing the set of features while saving computational resources. In one instance, the last layer of the shared layers 470 in the embodiment of the multi-branched model 460 shown in FIGS. 4A and 4B is the bottleneck layer, and the intermediate representation $z_{(i,j)}$ represents a compressed latent representation of the set of features at the input.

The online system 110 selects the set of parameters $\theta_p$ of the prediction portion as the set of parameters for the content selection model. Specifically, the online system 110 may select the parameters of the shared layers 470 and the prediction branch 472 as the set of parameters of the content selection model.

Figure 5:
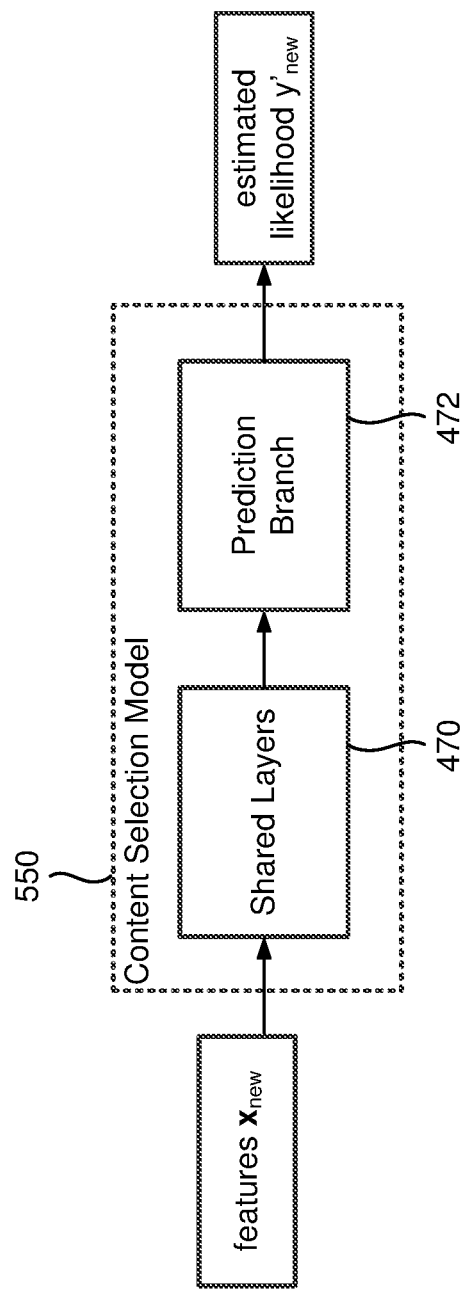
FIG. 5 illustrates a process of deploying the content selection model, in accordance with an embodiment.

FIG. 5 illustrates a process of deploying the content selection model, in accordance with an embodiment. As shown in FIG. 5, the content selection model 550 includes the prediction portion of the multi-branched model. Specifically, the content selection model 550 includes the shared layers 470 and the prediction branch 472 of the multi-branched model 460 shown in FIGS. 4A and 4B. The set of parameters $\theta_p$ of the prediction portion are selected as the parameters of the content selection model 550 after the training process for the multi-branched model is complete.

During the inference process, the online system 110 identifies a set of features $x_{new}$ for a new user-content item pair. The online system 110 generates the prediction likelihood for the new user-content item by applying the content selection model 550 to the set of features $x_{new}$. By selecting the set of parameters $\theta_p$ of the prediction portion as the set of parameters for the content selection model 550, the online system 110 can reduce bias in the content selection process, such that user-content items similar to those of the selected subset as well as the sampled subset can be adequately represented in the content selection process.

In another embodiment, the set of parameters for the content selection model are trained based on a multi-branched model including a first prediction portion and a second prediction portion that share one or more common parameters with each other. Specifically, different from the previous embodiments shown in FIGS. 3-5, both portions of the multi-branched model are configured to receive the set of features $x_{(i,j)}$ and output a prediction likelihood $y'_{(i,j)}$ for a user-content item pair. When the training process is completed, the set of parameters of each or both prediction portions may be selected as the set of parameters for the content selection model.

During the training process, the online system 110 repeatedly alternates between training the first prediction portion and the second prediction portion. The first prediction portion is trained using the training data T obtained from the selected subset of user-content item pairs. Different from the embodiments shown in FIGS. 3-5, the second prediction portion is trained using training data S' for the sampled set of user-content item pairs that are presented to users of the online system 110 even though some may be associated with low likelihoods of user interaction. The online system 110 obtains the training data S' by sampling the subset of evaluated user-content items, and presenting the sampled subset to corresponding users of the online system 110. The online system 110 identifies the set of features $x_{(i,j) \in S'}$ and corresponding labels $y_{(i,j) \in S'}$ indicating whether the users interacted with the content items.

The online system 110 selects either the first prediction portion or the second prediction portion for training. Responsive to selecting the first prediction portion, the online system 110 updates the parameters of the first prediction portion to reduce a first prediction loss. Responsive to selecting the second prediction portion, the online system updates the parameters of the second prediction portion to reduce a second prediction loss. The first prediction portion and the second prediction portion of the multi-branched model are each trained by repeatedly iterating through a forward pass step and a backpropagation step to update the parameters of the model. Similarly to the embodiments of FIGS. 3-5, the online system 110 may adjust the proportion of times the first prediction portion and the second prediction portion are selected for training based on random sampling, the amount of relative training data, and the like.

The first prediction loss can be represented similar to the prediction loss $L_p(\cdot)$ discussed in conjunction with FIGS. 3-5. Specifically, the first prediction loss can be given by:

$$L_{p1}(y'_{(i,j)\in T}, y_{(i,j)\in T}; \theta_{p1}) = \sum_{(i,j)\in T} \|y'_{(i,j)} - y_{(i,j)}\|_2^2$$

where $\theta_{p1}$ is the set of parameters for the first prediction portion. The second prediction loss represents a difference between the labels $y_{(i,j)\in S'}$ of the training data S' for the sampled subset and estimated labels $y'_{(i,j)\in S'}$ generated by applying the second prediction portion to the set of features $x_{(i,j)\in S'}$ for the selected subset. In one embodiment, the second prediction loss is given by:

$$L_{p2}(y'_{(i,j)\in S'}, y_{(i,j)\in S'}; \theta_{p2}) = \sum_{(i,j)\in S'} \|y'_{(i,j)} - y_{(i,j)}\|_2^2$$

where $\theta_{p2}$ is the set of parameters for the second prediction portion.

The first prediction portion and the second prediction portion of the multi-branched model can also share one or more common layers with each other. In one embodiment, the first prediction portion includes a shared portion and a first prediction branch that includes one or more layers specific to the first prediction portion. The first prediction branch is coupled to the shared portion and is configured to receive the intermediate representation $z_{(i,j)}$ and output the prediction likelihood $y'_{(i,j)}$ for the pair. The second prediction portion includes the shared portion and a second prediction branch that includes one or more layers specific to the second prediction portion. The second prediction branch is coupled to the shared portion and is configured to receive the intermediate representation $z_{(i,j)}$ and also output the prediction likelihood $y'_{(i,j)}$ for the pair.

Figure 6:
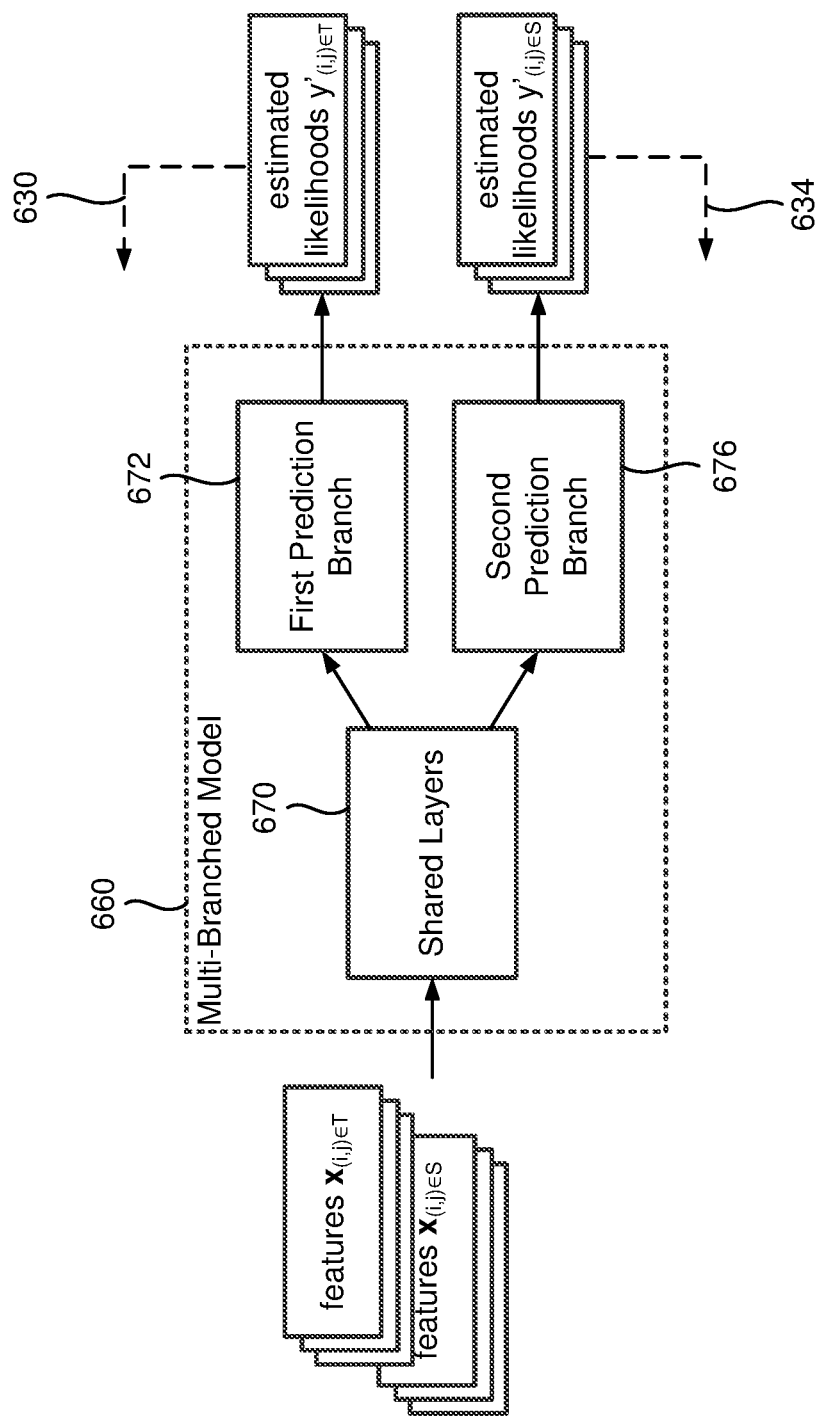
FIG. 6 illustrates a process of training the multi-branched model, in accordance with another embodiment.

FIG. 6 illustrates a process of training a first prediction portion and a second prediction portion of the multi-branched model, in accordance with an embodiment. As shown in FIG. 6, the multi-branched model 660 includes one or more shared layers 670, a first prediction branch 672, and a second prediction branch 676. The first prediction portion includes the shared layers 670 and the first prediction branch 672. The second prediction portion includes the shared layers 670 and the second prediction branch 676. The first prediction portion or the second prediction portion may also include one or more bottleneck layers that generates a compressed representation of the set of features at the input.

During the forward pass step of the training process for the first prediction portion, the online system 110 generates the estimated likelihoods $y'_{(i,j)\in T}$ by applying the first prediction portion with a set of estimated parameters to the set of features $x_{(i,j)\in T}$ of the training data T of the selected subset. In the embodiment shown in FIG. 6, the online system 110 generates the estimated likelihoods $y'_{(i,j)\in T}$ by propagating the set of features $x_{(i,j)\in T}$ through the shared layers 670 and the first prediction branch 672. During the backpropagation step, the online system 110 determines the first prediction loss 630 and updates the parameters $\theta_{p1}$ for the first prediction portion to reduce the first prediction loss 630. In the embodiment shown in FIG. 6, the online system 110 updates the parameters $\theta_s$ of the shared layers 670 and the parameters $\theta'_{p1}$ of the first prediction branch 672.

During the forward pass step of the training process for the second prediction portion, the online system 110 generates the estimated likelihoods $y'_{(i,j)\in S'}$ by applying the second prediction portion with a set of estimated parameters to the set of features $x_{(i,j)\in S'}$ of the training data S' of the sampled subset. In the embodiment shown in FIG. 6, the online system 110 generates the estimated likelihoods $y_{(i,j)\in S'}$ by propagating the set of features $x_{(i,j)\in S'}$ through the shared layers 670 and the second prediction branch 676. During the backpropagation step, the online system 110 determines the second prediction loss 634 and updates the parameters $\theta_{p2}$ for the second prediction portion to reduce the second prediction loss 634. In the embodiment shown in FIG. 6, the online system 110 updates the parameters $\theta_s$ of the shared layers 670 and the parameters $\theta'_{p2}$ of the second prediction branch 676.

By incorporating the labeled training data S' for the sampled subset of user-content items as well as the training data T for the selected subset of user-content items, the set of shared parameters $\theta_s$ common to the first prediction portion and the second prediction portion can learn relationships that contribute to prediction of user interaction likelihoods using training data obtained from both the selected subset and the sampled subset. Specifically, compared to the autoencoder portion of FIGS. 3-5, the second prediction portion can predict user interaction likelihoods from the set of features based on parameters trained using the labeled training data S' of the sampled subset. The set of parameters $\theta'_{p1}$ for the first prediction branch 672 and the set of parameters $\theta'_{p2}$ for the second prediction branch 676 can learn relationships specific to the prediction of user interaction likelihoods using labels specific to the selected subset and the sampled subset, respectively.

In addition, the multi-branched architecture including the first prediction portion and the second prediction portion is advantageous when a disproportionate amount of training data is available for the selected subset and sampled subset of user-content items. For example, the online system 110 may present a significantly smaller number of content items in the sampled subset compared to those in the selected subset if content items in the sampled subset are evaluated to have low prediction likelihoods. Although the online system 110 can train a content selection model using the sampled subset to reduce bias in the content selection process, the resulting model may suffer from low prediction accuracy due to the small amount of training data. By alternating between a training process for the first prediction portion and the second prediction portion in a multi-branched architecture, the shared layers 670 may take advantage of the large amount of training data from the selected subset, while the second prediction branch 676 is dedicated to learning relationships specific to the training data of the sampled subset.

In one embodiment, the online system 110 selects the set of parameters $\theta_{p2}$ of the second prediction portion as the set of parameters for the content selection model. Specifically, the online system 110 may select the parameters of the shared layers 670 and the second prediction branch 676 as the set of parameters of the content selection model. During the inference process, the online system 110 identifies the set of features $x_{new}$ for a new user-content item pair and generates the prediction likelihood $y_{new}$ for the new pair by applying the content selection model to the set of features $x_{new}$. Alternatively, the online system 110 may select the set of parameters $\theta_{p1}$ of the first prediction portion as the set of parameters of the content selection model.

In another embodiment, the online system 110 selects the set of parameters of both the second prediction portion and the first prediction portion as the set of parameters of the content selection model. During the inference process, the prediction likelihood $y_{new}$ for a new user-content item pair may be generated by applying the content selection model to the set of features $x_{new}$ to generate a first likelihood from the first prediction portion and a second likelihood from the second prediction portion. The prediction likelihood $y_{new}$ may be determined as the combination of the two. For example, the prediction likelihood $y_{new}$ may be determined as the average of the two.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable storage medium storing a content selection model, the content selection model associated with a set of parameters and configured to receive a set of features for a user-content item pair and output a likelihood that the user will interact with the content item, and the content selection model manufactured by a process comprising:

evaluating a plurality of content items for a plurality of users of an online system;

selecting one or more of the evaluated content items for presentation to a corresponding set of users based on their evaluations;

obtaining a first training dataset for a subset of the selected content items, the first training dataset including a set of user-content item features characterizing the selected subset of content items and corresponding users who were presented with the content items, and one or more labels indicating whether the corresponding users interacted with the selected subset of content items;

obtaining a second training dataset for a sampled subset of evaluated content items, the second training dataset including the set of content-user features characterizing the sampled subset of content items and corresponding users the sampled subset of content items were evaluated for;

for a multi-branched model associated with a set of parameters and including a prediction portion and an autoencoder portion that share one or more common parameters, repeatedly iterating the steps of:

selecting the prediction portion or the autoencoder portion for training, responsive to selecting the prediction portion, training the prediction portion by applying the prediction portion to the set of features of the first training dataset to estimate one or more labels, computing a prediction loss indicating a difference between the one or more labels of the first training dataset and the estimated labels, and backpropagating error terms obtained from the prediction loss to update a set of parameters of the prediction portion, and responsive to selecting the autoencoder portion, training the autoencoder portion by applying the autoencoder portion to the set of features of the second training dataset to generate a set of reconstructed features, computing an autoencoder loss indicating a difference between the set of features of the second training dataset and the set of reconstructed features, and backpropagating error terms obtained from the autoencoder loss to update a set of parameters of the autoencoder portion;

stopping the backpropagation steps after at least one of the prediction loss and the autoencoder loss satisfies a predetermined criteria; and storing the set of parameters of the prediction portion on the computer readable storage medium as the set of parameters of the content selection model.

2. The content selection model of claim 1, wherein the sampled subset of evaluated content items include content items that were not selected for presentation.

3. The content selection model of claim 1, wherein evaluating the plurality of content items comprises:
identifying the set of features for a plurality of user-content item pairs; and
generating, for each user-content item pair, a prediction likelihood for the pair by applying the content selection model with an initial set of parameters to the set of features for the user-content item pair.

4. The content selection model of claim 3, wherein selecting the one or more content items comprises selecting content items associated with prediction likelihoods above a predetermined threshold.

5. The content selection model of claim 1, wherein the multi-branched model is a neural network model including a plurality of layers of nodes.

6. The content selection model of claim 5, wherein the multi-branched model includes a shared portion including one or more layers common to the prediction portion and the autoencoder portion, the shared portion configured to receive the set of features for the user-content item pair and output an intermediate representation of the set of features.

7. The content selection model of claim 6, wherein the shared portion includes a bottleneck layer with a fewer number of nodes than a number of nodes in layers preceding the bottleneck layer.

8. The content selection model of claim 1, wherein selecting the prediction portion or the autoencoder portion for training comprises selecting the prediction portion with a first probability representing a relative proportion of data in the first training dataset, and selecting the autoencoder portion with a second probability representing a relative proportion of data in the second training dataset.

9. A method of selecting content items for display to a user of the online system, comprising:
evaluating a plurality of candidate content items using the content selection model of claim 1; and
selecting a set of candidate content items for display to the user based on the evaluations associated with the candidate content items.

10. A non-transitory computer readable storage medium storing a content selection model, the content selection model associated with a set of parameters and configured to receive a set of features for a user and a content item and output a likelihood that the user will interact with the content item, and the content selection model manufactured by a process comprising:
evaluating a plurality of content items for a plurality of users of an online system;
selecting one or more of the evaluated content items for presentation to a corresponding first set of users based on their evaluations;
sampling a subset of the evaluated content items for presentation to a corresponding second set of users;
obtaining a first training dataset for a subset of the selected content items, the first training dataset including a set of content-user features characterizing the selected subset of content items and corresponding users who were presented with the content items, and one or more first labels indicating whether the corresponding users interacted with the selected subset of content items;
obtaining a second training dataset for the sampled subset of content items, the second training dataset including the set of content-user features characterizing the sampled subset of content items and corresponding users who were presented with the content items, and one or more second labels indicating whether the corresponding users interacted with the sample set of content items;
for a multi-branch model associated with a set of parameters and including a first prediction portion and a second prediction portion that share one or more common parameters, repeatedly iterating the steps of:
selecting the first prediction portion or the second prediction portion for training,
responsive to selecting the first prediction portion, training the first prediction portion by applying the first prediction portion to the set of features of the first training dataset to estimate one or more labels, computing a first prediction loss indicating a difference between the one of more first labels of the first training dataset and the estimated labels, and backpropagating error terms obtained from the first prediction loss to update a set of parameters of the first prediction portion, and
responsive to selecting the second prediction portion, training the second prediction portion by applying the second prediction portion to the set of features of the second training dataset to estimate one or more labels, computing a second prediction loss indicating a difference between the one or more second labels of the second training dataset and the estimated labels, and backpropagating error terms obtained from a second prediction loss to update a set of parameters of the second prediction portion;
stopping the backpropagation steps after at least one of the prediction loss and the autoencoder loss satisfies a predetermined criteria; and
storing the set of parameters of the second prediction portion of the multi-branch model on the computer readable storage medium as the set of parameters of the content selection model.

11. The content selection model of claim 10, wherein the sampled subset of content items include content items that were not selected for presentation to the first set of users.

12. The content selection model of claim 10, wherein evaluating the plurality of content items comprises:
identifying the set of features for a plurality of user-content item pairs; and
generating, for each user-content item pair, a prediction likelihood for the pair by applying the content selection model with an initial set of parameters to the set of features for the user-content item pair.

13. The content selection model of claim 12, wherein selecting the one or more content items comprises selecting content items associated with prediction likelihoods above a predetermined threshold.

14. The content selection model of claim 10, wherein the multi-branched model is a neural network model including a plurality of layers of nodes.

15. The content selection model of claim 14, wherein the multi-branched model includes a shared portion common to the first prediction portion and the second prediction portion, the shared portion configured to receive the set of features for the user-content item pair and output an intermediate representation of the set of features.

16. The content selection model of claim 15, wherein the shared portion includes a bottleneck layer with a fewer number of nodes than a number of nodes in layers preceding the bottleneck layer.

17. The content selection model of claim 10, wherein selecting the first prediction portion or the second prediction portion for training comprises selecting the first prediction portion with a first probability representing a relative proportion of data in the first training dataset, and selecting the second prediction portion with a second probability representing a relative proportion of data in the second training dataset.

18. A method of selecting content items for display to a user of the online system, comprising:
- evaluating a plurality of candidate content items using the content selection model of claim 10; and
- selecting a set of candidate content items for display to the user based on the evaluations associated with the candidate content items.

19. The content selection model of claim 10, wherein the process further comprises additionally storing the set of parameters of the first prediction portion of the multi-branch model on the computer readable storage medium as the set of parameters of the content selection model.

20. A method of selecting content items for display to a user of the online system, comprising:
- for each of a plurality of candidate content items:
  - evaluating the candidate content item using the first prediction portion of the content selection model of claim 19 to generate a first evaluation,
  - evaluating the candidate content item using the second prediction portion of the content selection model of claim 19 to generate a second evaluation, and
  - combining the first evaluation and the second evaluation to generate a final evaluation; and
- selecting a set of candidate content items for display to the user based on the final evaluations associated with the candidate content items.

* * * * *